Figure 1:
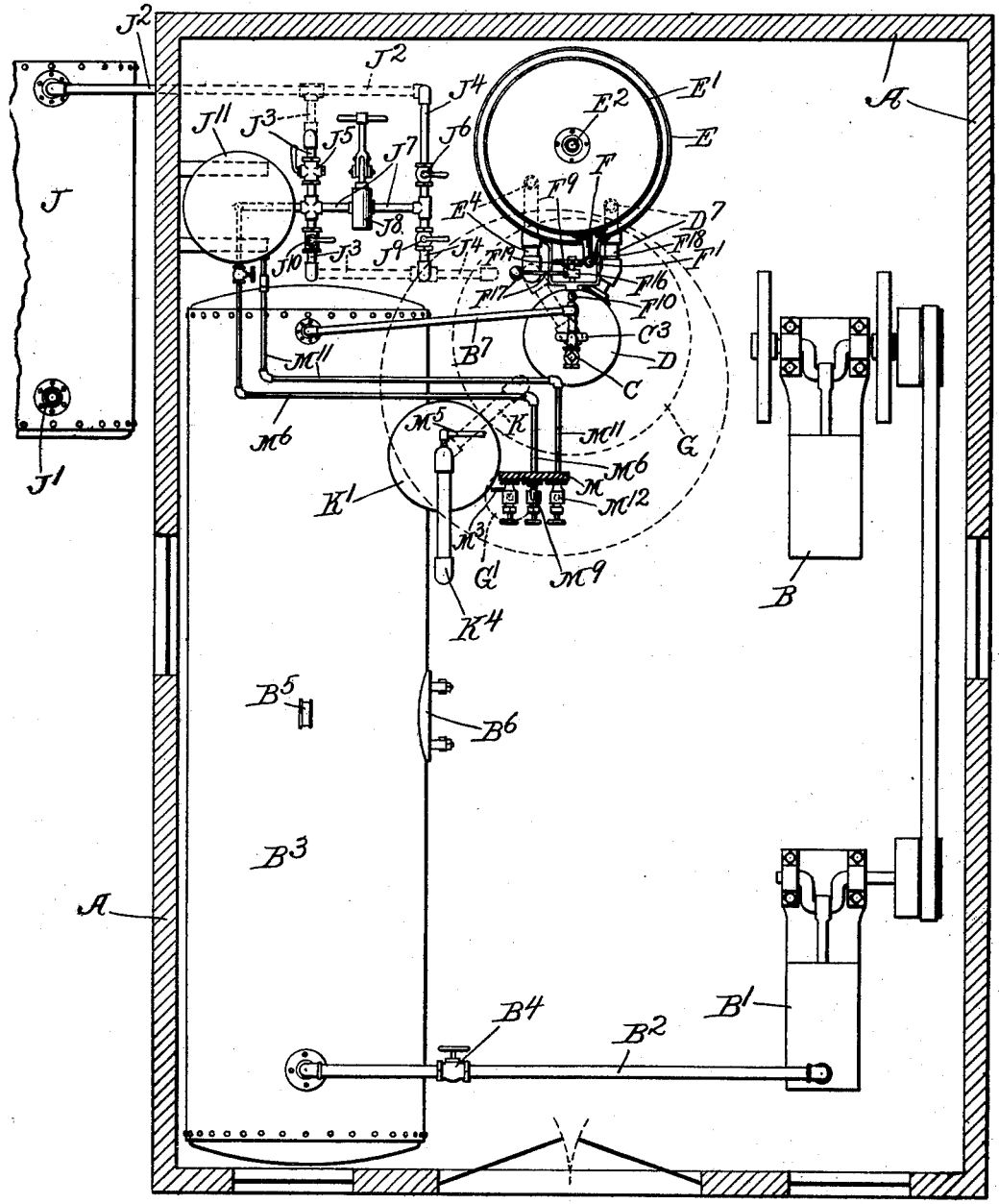

No. 737,901. PATENTED SEPT. 1, 1903.
J. A. BOWER.
TREATING AIR FOR USE IN CONNECTION WITH THE
MANUFACTURE OF GAS.
APPLICATION FILED AUG. 30, 1902.
NO MODEL. 5 SHEETS—SHEET 1.

Witnesses.
Edward T. Wray.
Weston B. Legran.

Inventor.
John A. Bower.
by Parker Parker
Attorneys.

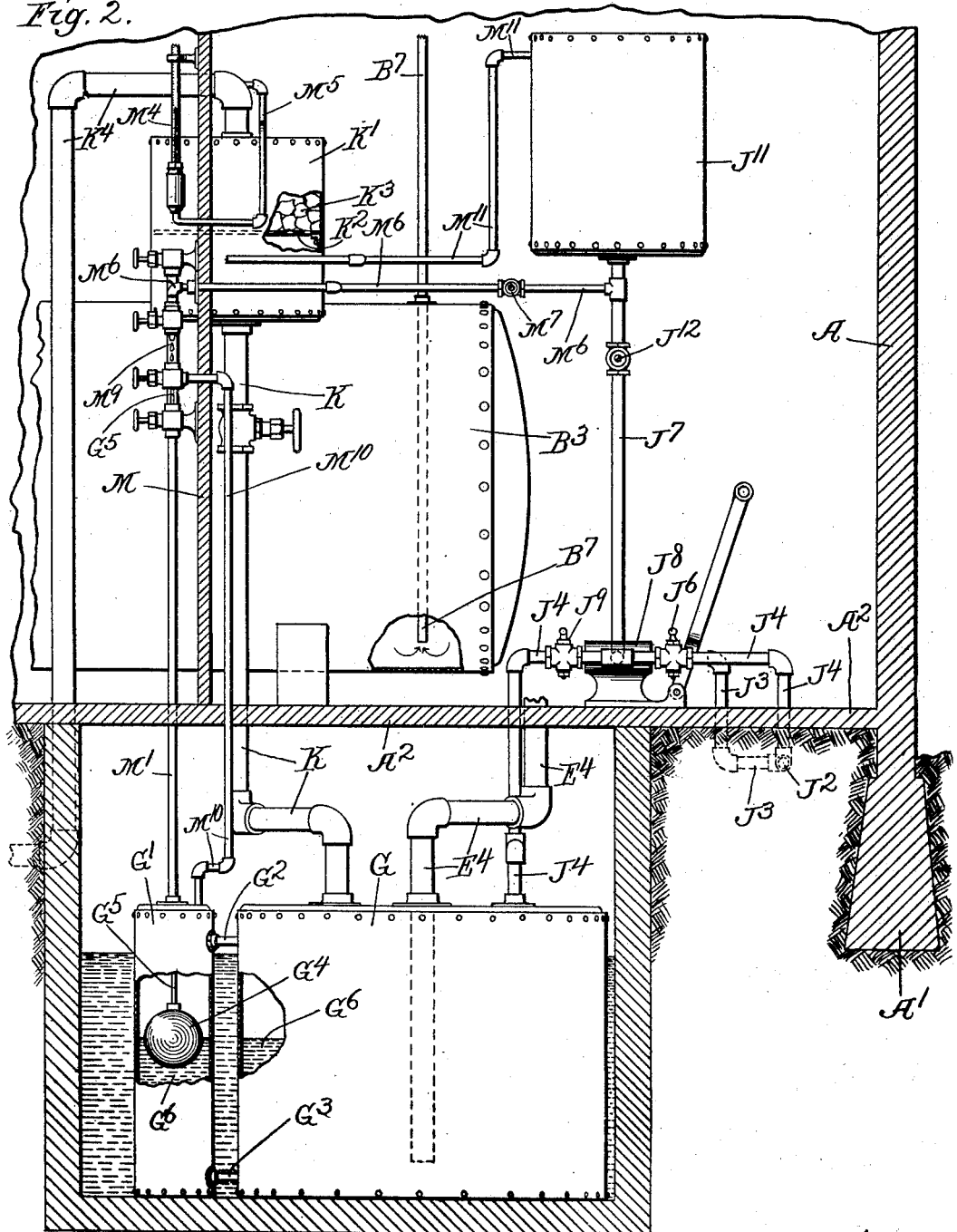

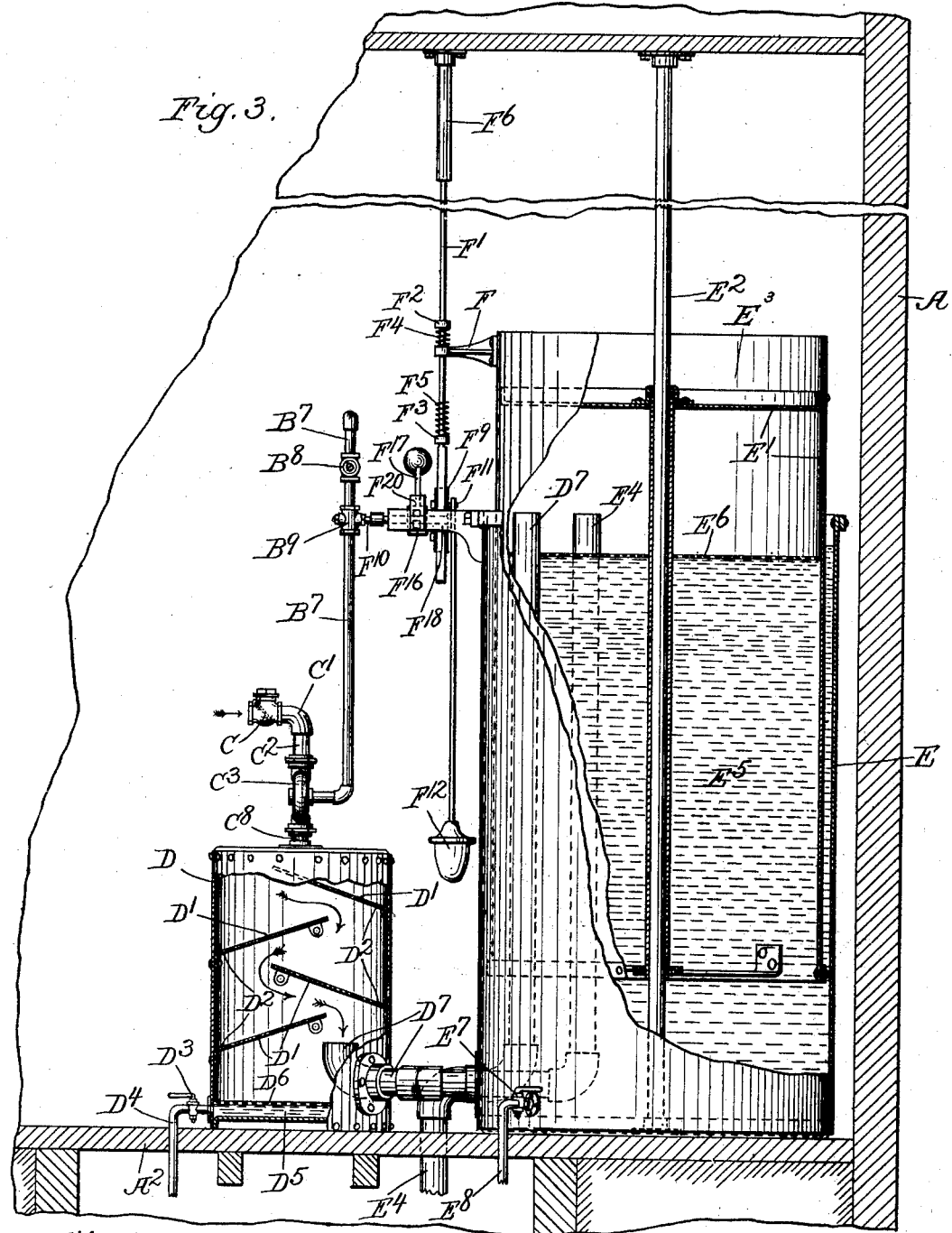

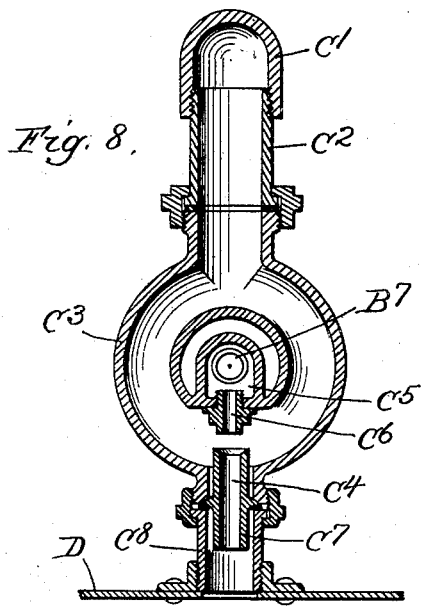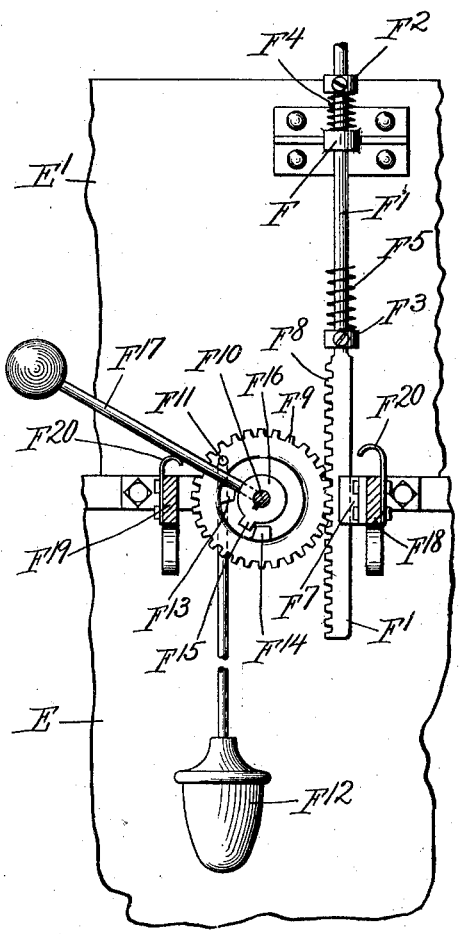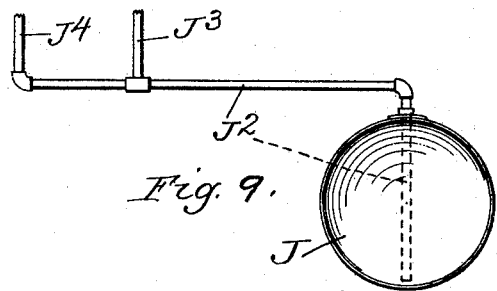

No. 737,901. PATENTED SEPT. 1, 1903.
J. A. BOWER.
TREATING AIR FOR USE IN CONNECTION WITH THE
MANUFACTURE OF GAS.
APPLICATION FILED AUG. 30, 1902.
NO MODEL. 5 SHEETS—SHEET 5.
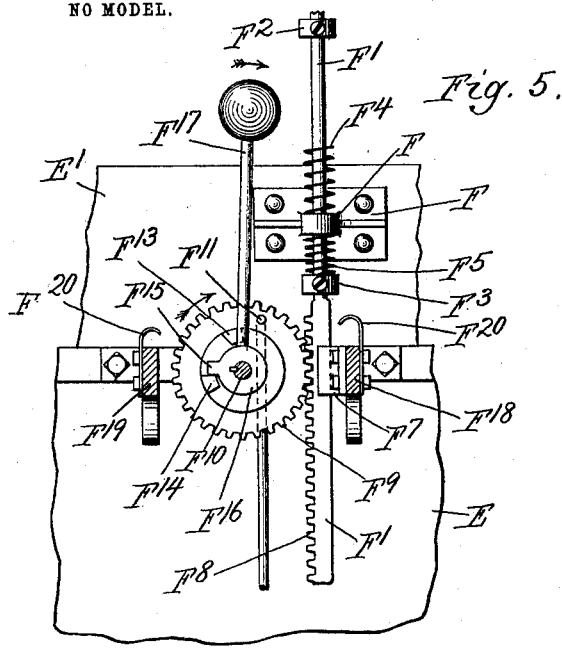
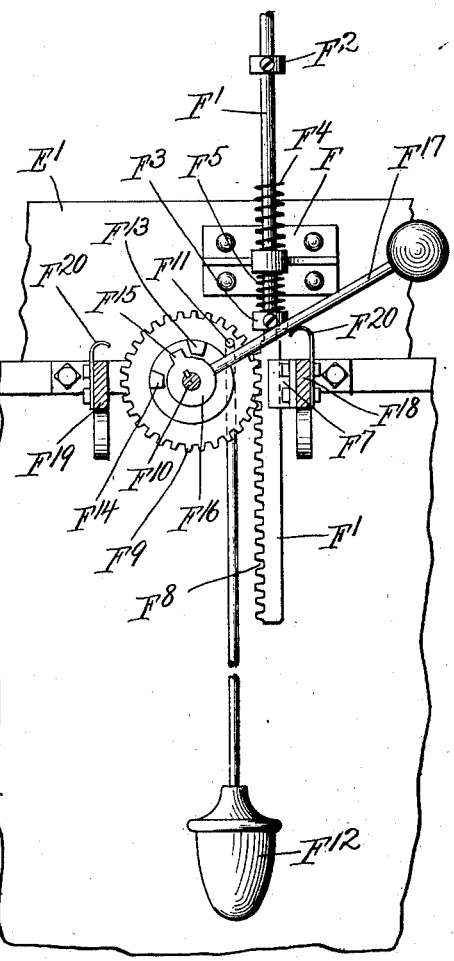
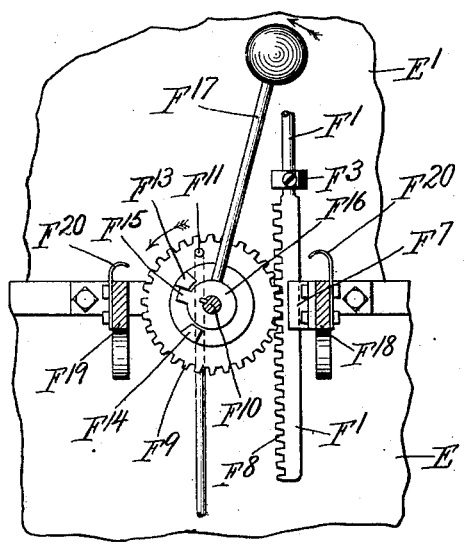
Witnesses.
Edward T. Wray.
Homer L. Kraft
Inventor.
John A. Bower.
by Parker
Attorneys.

No. 737,901. Patented September 1, 1903.

UNITED STATES PATENT OFFICE.

JOHN A. BOWER, OF WAUKEGAN, ILLINOIS, ASSIGNOR TO PRACTICAL GAS CONSTRUCTION COMPANY, OF NORTH CHICAGO, ILLINOIS, A CORPORATION OF ILLINOIS.

TREATING AIR FOR USE IN CONNECTION WITH THE MANUFACTURE OF GAS.

SPECIFICATION forming part of Letters Patent No. 737,901, dated September 1, 1903.

Application filed August 30, 1902. Serial No. 121,640½. (No specimens.)

*To all whom it may concern:*

Be it known that I, JOHN A. BOWER, a citizen of the United States, residing at Waukegan, in the county of Lake and State of Illinois, have invented certain new and useful Improvements in Treating Air for Use in Connection with the Manufacture of Gas, of which the following is a specification.

My invention relates to improvements in treating air for use in connection with the manufacture of gas.

My invention is illustrated in the accompanying drawings, wherein—

Figure 1 is a plan view of the various features which combine to illustrate my invention, with certain parts shown in cross-section. Fig. 2 is an elevation of a portion of the apparatus with parts shown in section and parts broken away. Fig. 3 is a part section and part elevation view of the aerometer and air-condenser with parts broken away. Figs. 4, 5, 6, and 7 are details of the regulator. Fig. 8 is a detail of the injector. Fig. 9 is a detail end view of the exterior oil-storage tank and connections.

I have shown the entire apparatus for the manufacture of gas, although so much as relates to the handling of the oil or the carbureting and distribution of the gas is made the subject-matter of a separate application.

Like parts are indicated by the same letter in all the figures.

A represents the inclosing wall of the building, A' A' the foundations thereof, and A² the floor.

B is a gas-engine. Any other kind of engine could be substituted.

B' is an air pump or compressor driven by the gas-engine.

B² is a pipe leading thence to the storage-tank B³. This pipe is controlled by the valve B⁴. The storage-tank is provided with a pressure-gage B⁵. B⁶ is a manhole-cover. B⁷ is a pipe which opens from within said tank and near the bottom thereof and is controlled by the valve B⁸ and by the valve B⁹. The pipe B⁷ proceeds from the last-named valve and finally terminates in the injector, the parts of which I will now describe.

C is a check-valve with a free opening from without connected with the elbow C', which is connected with the nipple C², which is connected with the casing C³ of the injector. This casing presents free passage-ways discharging through the opening C⁴, and the pipe B⁷ opens into the chamber C⁵ within the casing C³, and from the chamber C⁵ leads the opening C⁶, which discharges into the opening C⁴. Thus these parts operate as an injector, for if air under a high pressure from the storage-tank be admitted into the chamber C⁵ it will discharge through the opening C⁶ into the opening C⁴, and if the check-valve C has a free opening to the air by such action of the compressed air atmospheric air will be drawn through such check-valve and its connections and through the casing C³ into and through the opening C⁴. The opening C⁴ is formed within the tube-like part C⁷, which discharges into the nipple C⁸, which is attached to the top of the condenser D. This condenser is preferably in the shape of a cylinder, with top and bottom, and suitably supported on the floor of the building. It contains a number of inclined diaphragms D' D', which overlap at their inner ends and are provided with drip-holes D² D² near the wall of the condenser.

In the bottom of the condenser is a drip-valve D³, whence leads the pipe D⁴ to a cistern or discharge-point. I have shown within the condenser a quantity of water D⁵, with a layer of oil on top of the same, (indicated by the letter D⁶.) This oil is intended as a seal to prevent the reabsorption of the water in the bottom of the condenser by the air passing therethrough. The water is derived from the condensing operation incident to the expansion of the compressed air within the condenser in the presence of the atmospheric air. The drip-valve is intended to draw off the water, but not the oil, and the operator will so arrange the parts that the instant any oil begins to flow he will know that he has sufficiently reduced the quantity of water and will then discontinue the draining. Upwardly opening within the condenser D is the receiving end of the pipe D⁷, which leads into and opens near the upper end of the aerometer, which I will now describe.

The aerometer consists of an external upwardly-opening cylinder E, in which is disposed the downwardly-opening cylindrical bell E'. This bell is provided with a central tube, adapted to slide vertically on the rod $E^2$. It is provided at its upper end with the receptacle $E^3$, in which any desired amount of weight may be placed to determine the pressure within the aerometer. A pipe $E^4$ opens from within the upper end of the aerometer and leads thence to the carbureter. The two pipes in the aerometer may be of substantially the same length and reach to the same height. The aerometer, for the reasons hereinafter set out, commonly contains a quantity of water $E^5$, and on the top of this water I maintain an oil film $E^6$, which serves as a seal to prevent the reabsorption of such water by the air in the upper part of the aerometer. I provide below a drip-valve $E^7$, connected with the pipe $E^8$, which leads to a cistern or discharge.

I will now describe the regulator, which is operated by the aerometer to control the supply of compressed air. Extending outwardly from the bell is the arm F, which is provided with an eye to encircle the rod F' and which has two spiral springs $F^4$ and $F^5$, one above the arm and one below the arm and both encircling the rod. On the rod are the somewhat widely-separated stops $F^2$ and $F^3$. The upper end of the rod is guided in the sleeve $F^6$, and the lower end is guided in the bearing $F^7$, secured to the outer cylinder E of the aerometer. The lower end of the rod is provided with the rack $F^8$, which meshes with the pinion $F^9$, mounted so as to rotate on the shaft $F^{10}$, which shaft is, in fact, the controlling-stem of the valve $B^9$. On one side of the pinion is the pin $F^{11}$, from which depends the weight $F^{12}$, and on the other side of the pinion are the two lugs $F^{13}$ and $F^{14}$, which project outwardly into the path of a lug $F^{15}$ on the drum-like part $F^{16}$, which is rigid on the shaft $F^{10}$ and which carries rigid with itself the weighted arm $F^{17}$.

$F^{18}$ and $F^{19}$ are outwardly-projecting arms or brackets secured to the cylinder E and carrying each a spring-stop $F^{20}$ in the path of the weighted arm $F^{17}$. The bearing for the rod F' is connected with the arm $F^{18}$. The parts, as shown in Fig. 4, are in the position which they assume when the aerometer is full and the supply of air is cut off. If now the air in the aerometer be used, the quantity will gradually diminish, and the bell will begin to descend, carrying with it the rack $F^8$, and thus rotating the pinion. The engagement of the lug $F^{14}$ with the lug $F^{15}$ will gradually rotate the shaft $F^{10}$, thus bringing the valve $B^9$ toward the point of opening. When the parts have proceeded so far that the weighted arm $F^{17}$ is slightly beyond the vertical, as indicated in Fig. 5, such arm, by the action of its weight, will drop quickly to the limit of its motion toward the right and carry with it the shaft $F^{10}$, and thus open the valve. At the same time the point of engagement between the weight and the pinion will have passed to the right of the vertical, and the pinion will be by the action of the weight jerked around until the parts are in the positions indicated in Fig. 6, and here they will remain until the supply of air entering causes the bell of the aerometer to begin to rise. This will rotate the pinion in the opposite direction until the parts have assumed the position shown in Fig. 7, whereupon the action of the weight, whose point of engagement with the pinion is now to the left of the vertical, will cause the parts to rotate toward the left until the weighted arm is slightly to the left of the vertical, and this action will complete the preparation for closing the valve. The weighted arm $F^{17}$ now drops back to the position shown in Fig. 4, where the valve is closed. Thus the aerometer is made self-regulating by the control which it exercises over its supply of air through this regulator.

The pipe $E^4$ leads to the carbureter, which I will now describe.

I have described the carbureter and associated devices somewhat fully, so as to make the purpose and object of the air-treating mechanisms and their relations to the carbureting devices clear, though the carbureting proper is made the subject-matter of a separate application.

G is the carbureter, which I have shown in a cylindrical form. I do not here show the interior construction of the carbureter, as of course any desired form of carbureter can be employed. The pipe $E^4$ preferably opens in the bottom of the carbureter.

G' is an auxiliary tank connected at $G^2$ and $G^3$ with the carbureter G and provided with a float $G^4$ on the end of the rod $G^5$.

$G^6$ indicates a quantity of oil or like substance within the carbureter and its auxiliary tank.

The oil-supply devices consist of an oil-storage tank, consisting of connecting-pipes and pump and a gravity-tank.

J is the oil-storage tank, preferably located away from the main buildings and possibly under ground. It is provided with a filling-opening J'. From this tank, and preferably opening from the bottom thereof, leads the supply-pipe $J^2$, which pipe is provided with two extensions $J^3$, containing a valve $J^5$, and $J^4$, containing a valve $J^6$. Beyond these two valves the two extensions are connected by the cross-pipe $J^7$, between the two members of which is placed the pump $J^8$. The extension $J^4$ continues beyond the cross-pipe and opens into the carbureter G and is controlled by the valve $J^9$. The extension $J^3$ continues beyond the valve $J^5$ and opens into the pipe $J^4$ beyond the valve $J^9$ and is controlled by the valve $J^{10}$. The cross-pipe $J^7$ leads from its junction with the pipe $J^3$ to the gravity-tank $J^{11}$. It is controlled by the valve $J^{12}$. By this construction it is possible, by a proper manipulation of the valves, to perform the following functions: first, to pump oil from the tank through the pipe $J^4$, cross-pipe $J^7$, pump $J^8$, pipe $J^3$ to pipe $J^4$, and thence to carbureter; second, to pump oil from the oil-supply tank through pipe $J^4$, cross-pipe $J^7$, and extension thereof to the gravity-tank, and, third, to pump oil from the carbureter through pipe $J^4$, the pipe $J^7$, pipe $J^3$, and pipe $J^2$ back to the storage-tank. From the carbureter G leads the pipe K to the drier K', which is preferably composed of the cylindrical shell and, when preferred, diaphragm $K^2$ and a drying material above the diaphragm $K^3$. From this drier leads the pipe $K^4$ to the distributing-mains.

It will be understood, of course, that I have shown various parts and features here which might be greatly changed and altered without departing from the spirit of my invention. I have not attempted to describe in the minutest detail the different connections and adjustments, because they are subject to so much modification and are so readily understood by those skilled in the art. I have endeavored in my drawings to furnish, as it were, a diagrammatic representation of my invention and wish the drawings to be so taken and understood.

The use and operation of my invention are as follows: Any desired form of engine may be used to drive any desired form of compressor for the purpose of filling the air-storage tank, which should be filled with air under a high pressure. Of course the pressure will vary according to the requirements of each particular case. The air from this compressor is to be carried over into the carbureter; but it is first to be introduced into the aerometer, whereby the desired and uniform pressure is obtained and whereby the supply of air is controlled. This air also is, so far as possible, to be dried or freed from moisture. At the same time it is desirable to introduce into the carbureter along with the compressed air the largest possible quantity of atmospheric air to avoid the expense which is otherwise involved in compressing so large a quantity of air; but the atmospheric air is heavily charged with moisture, and therefore it is desirable to discharge the moisture from the same. I propose to introduce atmospheric air through an injector-like apparatus operated by the compressed air from the air-storage tank. Obviously, as soon as the atmospheric air and compressed air are passed through such injector the compressed air expands, with the result of depositing or tending to deposit its moisture and with the further result of depositing or condensing the moisture in the atmospheric air. I may now dispose of such water either in a condenser, such as I have shown, or in the aerometer, where it is added to the water therein to form the usual water seal. The condenser which I employ is provided with a series of overlapping diaphragms, which thus cause the air to pass through such condenser in a circuitous passage. The moisture of the atmospheric air and of the compressed air is condensed and deposited upon these diaphragms and runs back to the wall of such condenser and then drips through the openings down into the bottom of the condenser. Here it is drained away; but in order to prevent it from being reabsorbed by the air passing through the condenser I provide the oil seal on top of the water, which oil seal rises above the passage or drip-opening in the bottom of the condenser. The air, thus more or less freed from its moisture, passes up into the top of the aerometer, where still more of the water of condensation is discharged, and here again it drips through the oil seal and is thereafter prevented from being reabsorbed. The condenser might be dispensed with and the injector might lead directly to the aerometer, the whole of the water of condensation being thereafter deposited in the aerometer. Any excess of water in the aerometer may be drawn off from below. When the supply of compressed air ceases to flow into the injector, the check-valve in the passage-way leading to the atmospheric air closes. The regulator for the supply of compressed air is operated by the bell of the aerometer. As it rises it operates the weights to close the valve when it has reached the limit of its upward excursion, and in a similar way it also operates the weights to open the valve when the bell has reached the downward limit of its excursion. The carbureter is provided with a pipe which supplies it with air from the aerometer. It is also provided with a pipe by which oil can in certain cases, when desired, be directly forced into it from the storage-tank.

I claim—

1. In a machine for manufacturing gas the combination of an aerometer and pipe for the supply of air thereto and a regulator controlling said pipe and controlled by the movement of the bell of the aerometer, said regulator containing two weights which successively act upon the regulator-valve of the air-supply pipe.

2. In a machine for manufacturing gas the combination of an aerometer and pipe for the supply of air thereto and a regulator controlling said pipe and controlled by the movement of the bell of the aerometer, said regulator containing a rack associated with the bell and a pinion associated with the valve-stem of the regulator.

3. In a machine for manufacturing gas the combination of an aerometer and pipe for the supply of air thereto and a regulator controlling said pipe and controlled by the movement of the bell of the aerometer, said regulator containing a rack associated with the bell and a pinion associated with the valve-stem of the regulator and two weights, one associated directly with the pinion and the other directly with the valve-stem.

4. In a machine for manufacturing gas the combination of an aerometer and pipe for the supply of air thereto and a regulator controlling said pipe and controlled by the movement of the bell of the aerometer, said regulator containing a rack associated with the bell and a pinion associated with the valve-stem of the regulator and two weights, one associated directly with the pinion and the other directly with the valve-stem, and engaging lugs whereby the weight associated with the pinion coöperates with the weight associated with the valve-stem of the regulator.

JOHN A. BOWER.

Witnesses:
 HOMER L. KRAFT,
 FANNY B. FAY.